(12) United States Patent
Gao et al.

(10) Patent No.: US 7,469,467 B2
(45) Date of Patent: Dec. 30, 2008

(54) METHOD OF MANUFACTURING A PERPENDICULAR WRITE HEAD

(75) Inventors: Yunxiao Gao, Sunnyvale, CA (US); Hung-Chin Guthrie, Saratoga, CA (US); Ming Jiang, San Jose, CA (US); Sue Siyang Zhang, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 536 days.

(21) Appl. No.: 11/195,532

(22) Filed: Aug. 1, 2005

(65) Prior Publication Data
US 2006/0028762 A1 Feb. 9, 2006

Related U.S. Application Data

(63) Continuation-in-part of application No. 10/836,867, filed on Apr. 30, 2004.

(51) Int. Cl.
*G11B 5/127* (2006.01)
*H04R 31/00* (2006.01)

(52) U.S. Cl. .............. 29/603.16; 29/603.12; 29/603.13; 29/603.15; 29/603.18; 216/62; 216/66; 216/67; 360/121; 360/122; 360/317; 451/5; 451/41

(58) Field of Classification Search . 29/603.13–603.16, 29/603.18; 216/62, 66, 67; 360/122, 317; 451/5, 41
See application file for complete search history.

(56) References Cited

U.S. PATENT DOCUMENTS

| | | | |
|---|---|---|---|
| 6,728,064 B2 | 4/2004 | Sato et al. | |
| 6,738,222 B2 | 5/2004 | Sato et al. | |
| 2002/0078552 A1 | 6/2002 | Sato et al. | |
| 2002/0080525 A1 | 6/2002 | Sato et al. | |
| 2003/0112555 A1 | 6/2003 | Sato et al. | |
| 2004/0042118 A1 | 3/2004 | Notsuke et al. | |
| 2006/0002019 A1* | 1/2006 | Guthrie et al. | 360/125 |
| 2006/0174474 A1* | 8/2006 | Le | 29/603.12 |
| 2007/0026537 A1* | 2/2007 | Jiang et al. | 438/3 |

FOREIGN PATENT DOCUMENTS

| | | |
|---|---|---|
| JP | 4195908 | 7/1992 |
| JP | 2003203311 | 7/2003 |

OTHER PUBLICATIONS

Tomohiro Okada, Hisashi Kimura, Isao Nunokawa, Nobuo Yoshida, Kimitoshi Etoh, and Moriaki Fuyama, Fabricating Narrow and Trapezoidal Main Poles for Single-Pole-Type Heads, IEEE Transactions on Magnetics, vol. 40, No. 4, Jul. 2004.

* cited by examiner

*Primary Examiner*—Paul D Kim
(74) *Attorney, Agent, or Firm*—Law Offices of Imam

(57) ABSTRACT

A perpendicular write head includes a main pole comprising a Durimide/Alumina hard mask formed over a laminate layer process to form the main pole without using a liftoff or chemical mechanical polishing process, thereby avoiding rounding corners of the pole, the main pole being controlled in shape for improved control of critical dimension of track width and angle of the bevel to avoid undesirable adjacent track writing.

9 Claims, 4 Drawing Sheets

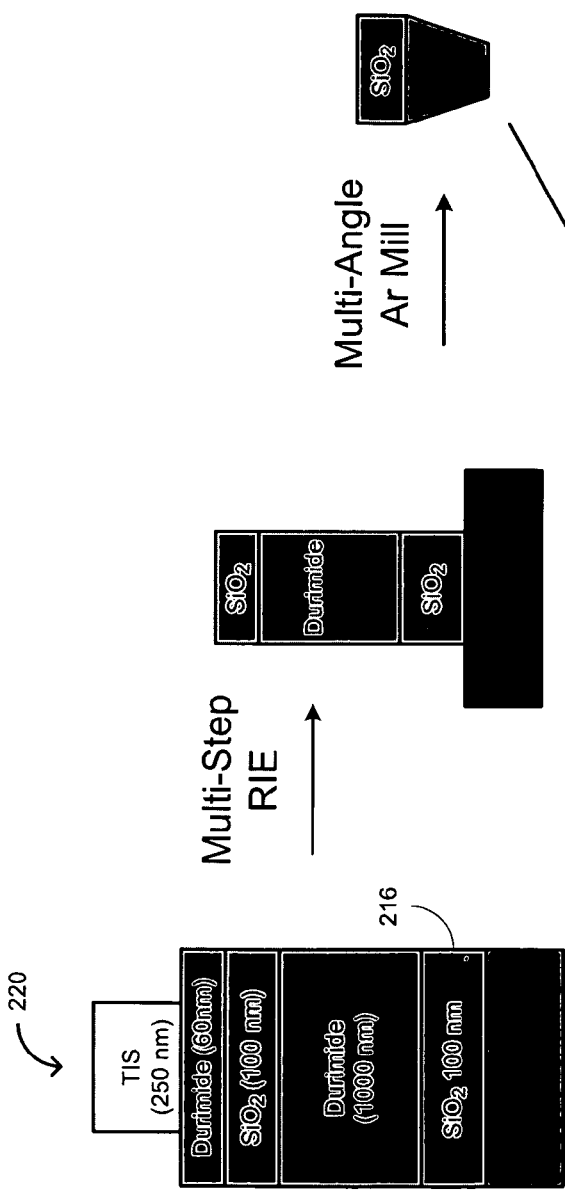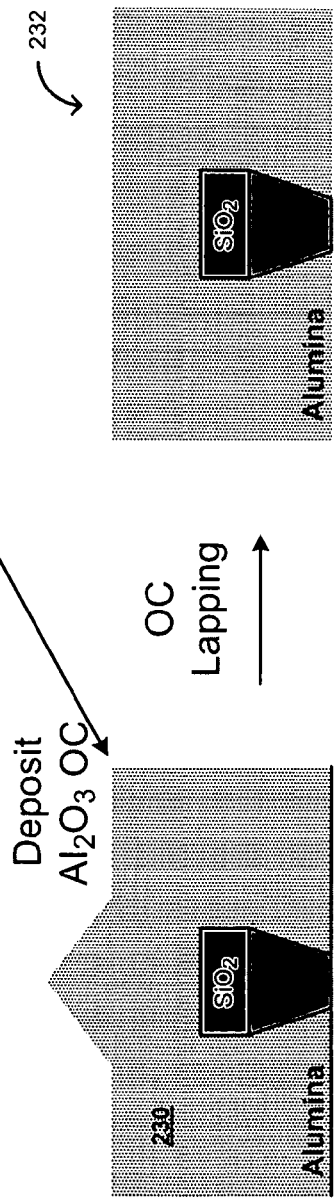

METHOD OF MANUFACTURING A PERPENDICULAR WRITE HEAD

CROSS REFERENCE TO RELATED APPLICATIONS

This application is a continuation-in-part of prior U.S. patent application Ser. No. 10/836,867 filed on Apr. 30, 2004 and entitled "HIGH MILLING RESISTANCE WRITE POLE FABRICATION FOR PERPENDICULAR RECORDING," the contents of which is incorporated herein by reference as though set forth in full and related to U.S. patent application Ser. No. 11/195,227, filed on Aug. 1, 2005 and entitled "BILAYER TRAILING SHIELD GAP FOR PERPENDICULAR HEAD", the contents of which is incorporated herein by reference, as though set forth in full, and related to U.S. patent application Ser. No. 11/195,222, filed on Aug. 1, 2005 and entitled "PERPENDICULAR HEAD WITH TRAILING SHIELD AND RHODIUM GAP PROCESS", the contents of which is incorporated herein by reference, as though set forth in full.

FIELD OF THE INVENTION

This invention relates generally to the field of perpendicular magnetic recording (or write) heads and more particularly, to a main pole within the write head being made of laminated magnetic material, such as a hybrid Durimide/alumina mask for controlling beveling of the pole and track width thereof to increase performance.

DESCRIPTION OF THE PRIOR ART

As the recording density of magnetic hard drives (or disc drives) increases, a physical limitation is experienced using longitudinal recording systems partly due to thermal relaxation known as super-paramagnetism. That is, the density requirements for meeting today's storage needs are simply not attainable with longitudinal recording systems. To provide further insight into this problem, it is anticipated that longitudinal recording systems will lose popularity as storage capacities in excess of about 150 Gigabytes-per-square-inches become a requirement.

These and other factors have lead to the development and expected launch of perpendicular recording heads or write heads. Perpendicular recording is promising in pushing the recording density beyond the limit of longitudinal recording.

Accordingly, perpendicular recording potentially supports much higher linear density than longitudinal recording due to lower demagnetizing fields in recorded bits. A magnetic recording head for perpendicular writing generally includes two portions, a writer portion for writing or programming magnetically-encoded information on a magnetic media or disc and a reader portion for reading or retrieving the stored information from the media.

The writer of the magnetic recording head for perpendicular recording typically includes a main pole and a return pole which are magnetically separated from each other at an air bearing surface (ABS) of the writer by a nonmagnetic gap layer, and which are magnetically connected to each other at a back gap closure (yoke). This structure is a single-pole write head because while a main pole and return pole are referred thereto, the return pole is not physically a pole, rather, it serves to close the loop with the main pole and the soft under layer of the media to form a magnetic flux circuit.

Positioned at least partially between the main and return poles are one or more layers of conductive coils encapsulated by insulation layers. The ABS is the surface of the magnetic head immediately adjacent to the perpendicular medium.

To write data to the magnetic medium, an electrical current is caused to flow through the conductive coil, thereby inducing a magnetic field across the gap between the main and return poles. By reversing the polarity of the current through the coil, the polarity of the data written to the magnetic media is also reversed.

The main and return poles are generally made of a soft magnetic material. The main pole generates magnetic field in the media during recording when the write current is applied to the coil. A magnetic moment of the main pole should be oriented along an easy axis parallel to the ABS when the main pole is in a quiescent state, namely without a write current field from the write coil.

With the advent of perpendicular recording heads, density has been greatly increased, as discussed hereinabove, which has lead to a greater need for accurate recording of data onto the desired track. That is, writing to adjacent tracks is highly undesirable because it causes corruption of data on adjacent tracks.

In the recording head, namely the slider, the main and return poles are separated by the gap layer, causing writing of data onto tracks. The main pole is generally beveled in shape in an effort to reduce adjacent track writing. Controlling the track width so as to better line up with the track to be written thereto needs further improvement, as does controlling the angle of the bevel of the trapezoidal shape design of the main pole.

It is vital for the corners of the trapezoidal-shaped main pole to be straight rather than rounded, which often is experienced during manufacturing of the main pole. Such corner rounding generally results in the magnetic field that is induced onto the disc to be curved rather than straight. This effect adversely impacts system performance by degrading accurate recording of data onto the disc, as well as, unnecessarily higher power consumption.

One reason for such corner rounding is the use of chemical mechanical polishing (CMP) processing for cleaning or polishing the surface of the main pole after patterning the latter. Eliminating such a step, eliminates or at a minimum, reduces the problem associated with corner-rounding. More specifically, in current manufacturing techniques, processes of ion milling patterning with durimide and CMP liftoff are performed. The problem with these techniques is that the CMP liftoff process damages the write pole. In fact, using current manufacturing techniques exhibit 15% of the write poles to have rounded corners thereby significantly degrading performance. Additionally, ion milling of a critical dimension of the write pole width and creating beveled angles for reasons described herein are not well-controlled, using only durimide, thereby causing erroneous adjacent track writing.

Thus, in light of the foregoing, there is a need for a perpendicular recording head having a main pole developed in such a way so as to pattern the main pole structure that is trapezoidal shape as well as prevent rounding of corners and to do so by eliminating a CMP liftoff step.

SUMMARY OF THE INVENTION

Briefly, one embodiment of the present invention includes a perpendicular write head and a method of manufacturing the same. The write head includes a main pole that is formed using a hybrid mask formed over a laminate layer to form the main pole, without using a chemical mechanical polishing process, thereby avoiding rounding corners of the pole, the main pole being beveled in shape for improved control of track width and angle of the bevel to avoid undesirable adjacent track writing.

IN THE DRAWINGS

FIGS. 8-12 show an alternative embodiment and method of the present invention.

DETAILED DESCRIPTION OF THE PREFERRED EMBODIMENT

Figure 1:
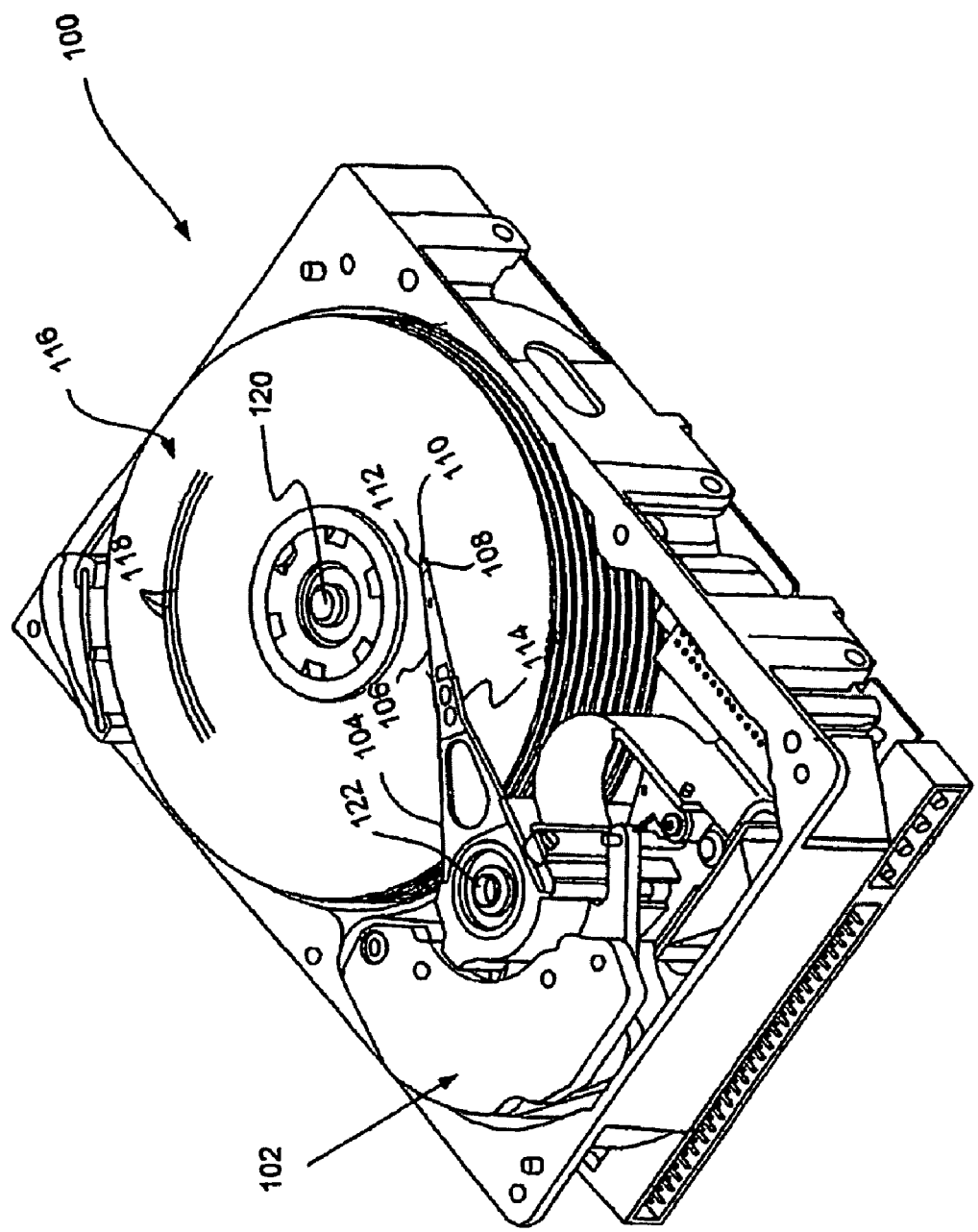
FIG. 1 shows a top perspective view of a disc drive 100 is shown in accordance with an embodiment of the present invention.

Referring now to FIG. 1, a top perspective view of a disc drive 100 is shown in accordance with an embodiment of the present invention. The disc 100 is shown to include a voice coil motor (VCM) 102, an actuator arm 104, a suspension 106, a flexure 108, a slider 110, a read-write (perpendicular) head 112, a head mounting block 114, and disc or media 116. Suspension 106 is connected to the actuator arm 104 at the head mounting block 114. The actuator arm 104 is coupled to the VCM 102. The disc 116 includes a plurality of tracks 118 and rotates about axis 120. The tracks 118 are circular, each extending circularly around the surface of the disc 116 for storing magnetically-encoded data or information using the perpendicular head 112, which will be discussed in greater detail with respect to further figures.

During operation of the disc drive 100, rotation of the disc 116 generates air movement which is encountered by the slider 110. This air movement acts to keep the slider 110 afloat a small distance above the surface of the disc 116, allowing the slider 110 to fly above the surface of the disc 116. The VCM 102 is selectively operated to move the actuator arm 104 around the axis 120, thereby moving the suspension 106 and positioning the transducing head (not shown), which includes a main pole (not shown), by the slider 110 over the tracks 118 of the disc 116. It is imperative to position the transducing head properly to read and write data from and to the concentric tracks 118.

Figure 2:
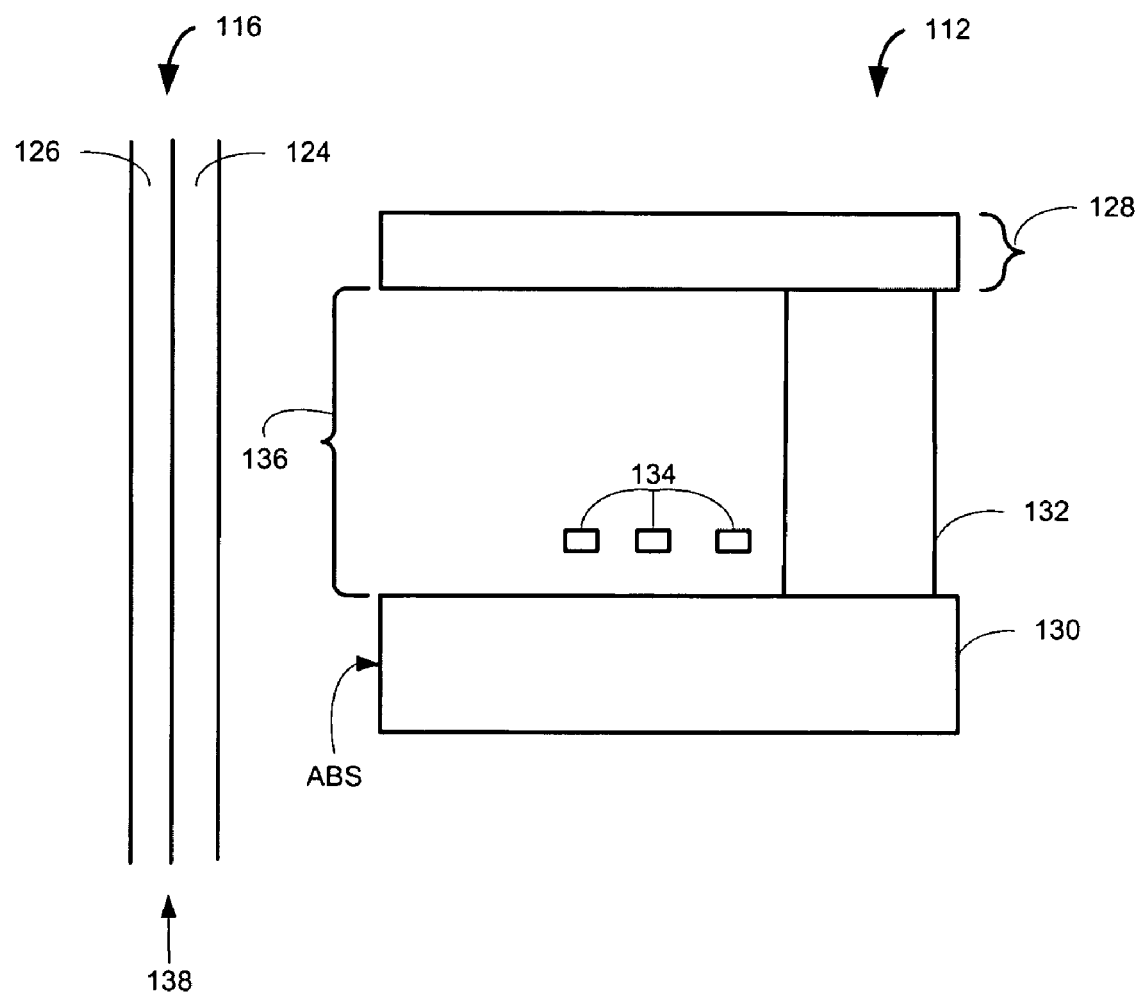
FIG. 2 shows a cross-sectional view of an embodiment of the perpendicular write head 112 in accordance with an embodiment of the present invention.

FIG. 2 shows a cross-sectional view of an embodiment of the perpendicular head (or recorder) 112, which embodies the present invention. The disc (or medium) 116 utilized by perpendicular recorders generally includes a thin storage layer 124 having high coercivity and perpendicular anisotropy (the magnetization is held in a direction substantially normal to the surface of the disc 116) and a soft magnetic underlayer or keeper 126 having high permeability.

The perpendicular recorder (or perpendicular write head) 112 comprises a main pole 128, a return pole 130, connected to each other by a back gap closure 132 at a distal end and separated from each other by a gap 136 at the ABS and write coil 134 positioned between the main pole 128 and the return pole 130. It should be noted that structures presented in various figures of the embodiments of the present invention are not shown to scale.

Magnetization directions on the disc 116 are written by the main pole 128. The main pole 128 has 0.15 micron width at the ABS to provide recording of ultra-narrow tracks on the disc 116. Furthermore, the proposed structure of the main pole 128 decreases remnant field in the media as well as coil current for saturation field thereby reducing undesirable data erasures, faster write performance and a reduction in mechanical failures due to the lack of need for high current.

To write data to the perpendicular magnetic disc (or medium) 116, a time-varying write current is caused to flow through the coil 134, which in turn produces a time-varying magnetic field through the main pole 128 and the return pole 130. The disc 116 is then passed by the ABS of the recorder 112 at a predetermined distance such that the disc 116 is exposed to the magnetic field.

A closed magnetic path for flux from the writer 112 to the disc 116 travels from the main pole 128, through the recording layer 124 of the disc 116 to the soft magnetic layer (keeper) 126 and returns to the recorder 112 through the return pole 130, again passing through the storage layer 124. To ensure that the magnetic field does not write data on the return path, while not obvious in FIG. 2, the surface area of the return pole 130 at the ABS is generally substantially larger than the surface area of the main pole 128 at the ABS. Thus, the strength of the magnetic field affecting the storage layer 124 under the return pole 130 will not be sufficient to overcome a nucleation field of the storage layer 124. Prior to further discussion, it should be noted that the illustrations shown in the various figures of this document are not rendered to scale.

For information regarding other ways of forming or manufacturing the main pole, the reader is referred to U.S. patent application Ser. No. 11/195,227, filed on Aug. 1, 2005 and entitled "BILAYER TRAILING SHIELD GAP FOR PERPENDICULAR HEAD", the contents of which is incorporated herein by reference, as though set forth in full, and to U.S. patent application Ser. No. 11/195,222, filed on Aug. 1, 2005 and entitled "PERPENDICULAR HEAD WITH TRAILING SHIELD and Rhodium Gap PROCESS, the contents of which is incorporated herein by reference, as though set forth in full.

Figures 3, 4, 5, 6, 7:
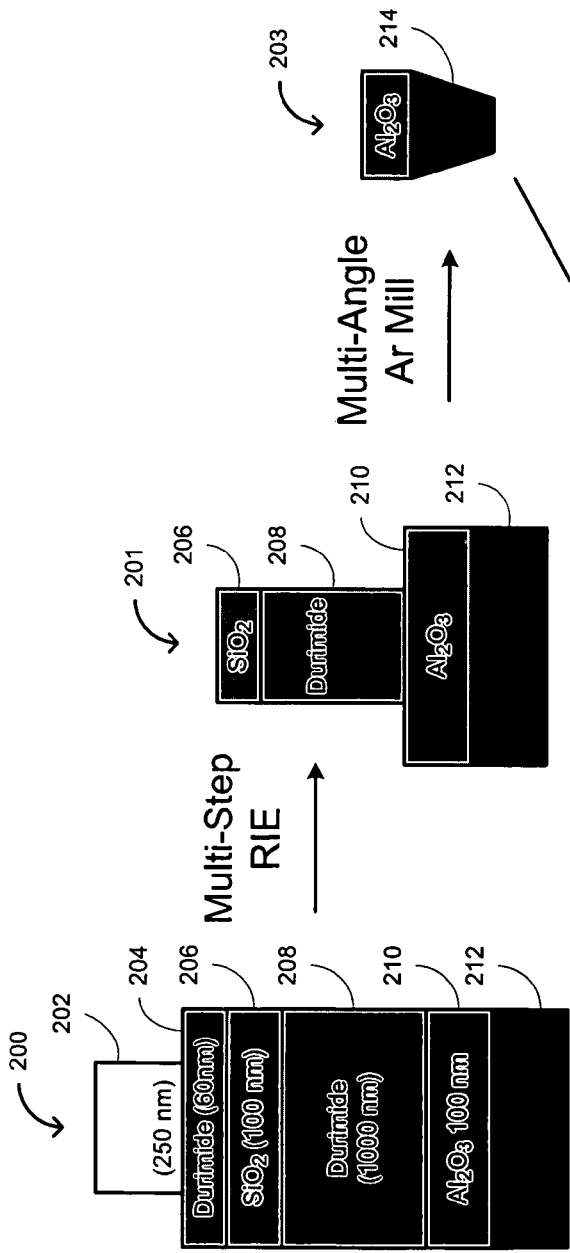
FIGS. 3-7 show the relevant steps of manufacturing the main pole 128 in accordance with an embodiment and method of the present invention.

The main pole 128 and manufacturing thereof includes the present invention. FIGS. 3-7 show the relevant steps of manufacturing the main pole 128 and the structure, as shown in FIG. 7 of the main pole 128, in accordance with an embodiment of the present invention.

FIG. 3 shows the structure 200 to include a (electronic-beam) photoresist layer 202 shown to be formed above a durimide layer 204, which is, in turn, shown formed above a silicon dioxide (SiO2) layer 206, which is, in turn, shown formed above a durimide layer 208. The durimide layer 208 is shown formed above a hard mask 210, which is shown formed a laminate layer 212. The laminate layer 212 is ultimately formed into a beveled angle main pole, as will be apparent shortly. In one embodiment of the present invention, the hard mask 210 is an aluminum oxide (Al2O3) layer 210.

Regarding the size of each layer of the structure 200, in one embodiment of the present invention, the photoresist layer 202 is 250 nanometers in thickness, however, it can be anywhere from 100-250 nanometers in thickness. In one embodiment of the present invention, the durimide layer 204 is 60 nanometers in thickness, however, it can be anywhere from 20-120 nanometers in thickness. In one embodiment of the present invention, the silicon oxide layer 206 is 100 nanometers in thickness, however, it can be anywhere from 50-150 nanometers in thickness. In one embodiment of the present invention, the durimide layer 208 is 1000 nanometers in thickness, however, it can be anywhere from 500-1500 nanometers in thickness. In one embodiment of the present invention, the hard mask 210 is 100 nanometers in thickness, however, it can be anywhere from 20-200 nanometers in thickness. In one embodiment of the present invention, the laminate layer 212 is 240 nanometers in thickness, however, it can be anywhere from 10-300 nanometers in thickness.

In the structure 200, the layer 202 essentially serves as an image resist layer, the layer 204 essentially serves as ARC (anti-reflective coating layer), the layer 206 essentially serves as hard mask, the layer 208 serves essentially as a soft mask (or underlayer), the layer 210 essentially serves as hard mask and the layer 212 is the main pole material.

In alternative embodiments, the hard mask 210 may be made of $Al_2O_3$, $SiO_3$, SiC, SiOxNy, AlSiOx, Ta, TaOx or TaN.

A multi-step reactive ion etching (RIE) process is performed to obtain a structure 201 of FIG. 4 from that of the structure 200 of FIG. 3. During such process, the photoresist layer 202 and the durimide layer 204 are removed by a repetitive RIE process.

Next, a reactive fluorine mill, and a multiple-step and multi-angle milling process are performed to form the structure 203 of FIG. 5, which shows the layer 212 to have become beveled to create the beveled laminate main pole 214. Additionally, milling removes the durimide layer 208 and the $SiO_2$ layer 206. Ion milling uses ion beam to remove materials. The removal rate and the resulting shape are highly affected by the incident angle of the ion beam to the surface of the material. Close to vertical angle is used to form vertical shape and a lesser vertical angle to form bevel. The angle ranges from -10 to -70 degree. The presence of the hard mask 210 made of, for example, aluminum oxide, improves controlling of the bevel and aluminum oxide erodes much less than soft masks, such as durimide or DLC. Additionally, improved track width control is also achieved, which is of utmost importance in perpendicular recording heads due to their higher density.

Thereafter, as shown in FIG. 6, an alumina overcoat layer is deposited onto the structure 203 of FIG. 5. Alumina is basically $Al_2O_3$. The reason for an elevated topography (structure) 219 in the alumina layer is the presence of the structure 203 during deposition. That is, because alumina is deposited everywhere, where there is a raised structure, such as the structure 203, alumina is deposited over the raised structure thereby causing an elevated topography.

Next, a lapping process is performed removing the structure 219 to achieve a planar surface or the planarized structure 220.

The ion milling rate of hard mask, i.e. the $Al_2O_3$ layer 210, and the durimide layer 208 is 1:1, the thickness of these layers is adjusted to ensure that no durimide layer remains on the hard mask. With the embodiments of the present invention, as shown and discussed hereinabove, there is no CMP liftoff necessary that can cause corner rounding. Additionally, hard mask is favorable for ion milling of the critical dimension and bevel angle control.

In an alternative embodiment of the present invention, shown in the steps and structures of the FIGS. 8-12, the structures and steps of FIGS. 3-7 are shown substituting the hard mask 210 with the silicon oxide $SiO_2$ layer 216 to form the structure 220. Ultimately, the structure 232 results and all of the steps and material and layers of FIGS. 8-12 are similar to that of FIGS. 3-7, respectively, except that the layer 216 is made of SiO2, which is also basically a hard mask and provides the same benefits as that discussed hereinabove relative to Al2O3. Other alternatives for the hard mask 210 of FIGS. 3-7 include SiO2, SiC, SiOxNy, AlSiOx, Ta, TaOx, TaN.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of manufacturing a perpendicular write head comprising:
    forming a first hard mask upon a laminate layer;
    forming a first soft mask upon the first hard mask;
    forming a second hard mask upon the first soft mask;
    forming an anti-reflective layer upon the second hard mask;
    forming an image resist layer upon the anti-reflective layer;
    performing a multi-step reactive ion etching (RIE) process to remove the anti-reflective layer and the image resist layer;
    performing a multi-step and multi-angle reactive fluorine milling step to form a bevel-angled main pole;
    depositing an alumina overcoat layer; and
    lapping said alumina overcoat layer to form a planar surface.

2. The method of manufacturing a perpendicular write head, as recited in claim 1, wherein the first hard mask is made of an $Al_2O_3$ layer.

3. The method of manufacturing a perpendicular write head, as recited in claim 1, wherein the thickness of the first hard mask is within the range 20-200 nm.

4. The method of manufacturing a perpendicular write head, as recited in claim 1, wherein the first soft mask is made of a durimide layer and is within the range 500-1500 nanometers.

5. The method of manufacturing a perpendicular write head, as recited in claim 1, wherein the second hard mask is made of a $SiO_2$ layer and is within the range 50-150 nanometers.

6. The method of manufacturing a perpendicular write head, as recited in claim 1, wherein the anti-reflective layer is made of a durimide layer and is within the range 20-120 nanometers.

7. The method of manufacturing a perpendicular write head, as recited in claim 1, wherein the image resist layer is a photoresist layer and is within the range 100-250 nanometers.

8. The method of manufacturing a perpendicular write head, as recited in claim 7, further including the steps of multi-angle milling to remove the first soft mask and the second hard mask and beveling the laminate layer to form the main pole.

9. The method of manufacturing a perpendicular write head, as recited in claim 1, wherein the first hard mask is selected from the group consisting of $Al_2O_3$, $SiO_3$, SiC, SiOxNy, AlSiOx, Ta, TaOx and TaN.

* * * * *